US006882692B2

(12) United States Patent
Somayazulu

(10) Patent No.: US 6,882,692 B2
(45) Date of Patent: Apr. 19, 2005

(54) FAST TRANSFORM SYSTEM FOR AN EXTENDED DATA RATE WLAN SYSTEM

(75) Inventor: V. Srinivasa Somayazulu, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 650 days.

(21) Appl. No.: 09/753,047

(22) Filed: Dec. 29, 2000

(65) Prior Publication Data

US 2002/0122466 A1 Sep. 5, 2002

(51) Int. Cl.[7] ............................................... H03D 1/00
(52) U.S. Cl. ...................... 375/343; 375/142; 375/150; 708/422
(58) Field of Search ........................... 375/142, 143, 375/150, 152, 343; 708/314, 422, 426; 370/320, 335, 342, 209

(56) References Cited

U.S. PATENT DOCUMENTS

| 5,285,472 A | * | 2/1994 | Leonard et al. ............. 375/150 |
| 5,305,349 A | * | 4/1994 | Dent .......................... 370/209 |
| 5,377,183 A | * | 12/1994 | Dent .......................... 370/335 |
| 5,764,690 A | * | 6/1998 | Blanchard et al. .......... 375/147 |
| 5,982,807 A | | 11/1999 | Snell |
| 6,473,449 B1 | * | 10/2002 | Cafarella et al. ........... 375/141 |

OTHER PUBLICATIONS

Draft Supplement to Standard For Information Technology—Telecommunications and Information Exchange Between Systems– Specific Requirements– Part 11: Wireless LAN Medium Access Control (MAC) and Physical Layer (PHY) specifications: Higher Speed Physical Layer (PHY) Extension in the 2.4 GHz Band, 1999, IEEE P802.11b/D4.0, IEEE, USA.

Webster, Mark and Andren, Carl; Harris/Lucent CCK Description: Additional Covercode and Fast Transform Detail; Sep., 1998; doc,: IEEE 802.11-98/331; Harris Semiconductor, Melbourne, FL.

Andren, Carl and Webster, Mark; CCK Modulation Delivers 11 Mbps for High Rate IEEE 802.11 Extension, 1999, Harris Semiconductor, Palm Bay, FL.

Pearson, Bob; Complementary Code Keying Made Simple, Application Note AN9850.1; May 2000; Intersil Corporation, Melbourne, FL.

* cited by examiner

Primary Examiner—Young T. Tse
(74) Attorney, Agent, or Firm—Chernoff, Vilhauer, McClung & Stenzel, LLP

(57) ABSTRACT

In a direct sequence spread spectrum receiver an "as received" signal is decoded by correlation. Phase shift key, complementary code key modulated signals are correlated by transforming samples of the signal in a series of butterfly transform processors producing a number of correlations equal to the number of possible transmitted codewords. The largest correlation is selected as the transmitted signal. To reduce the number of processors required to transform a multi-level phase shift key signal, a correlation method and apparatus are disclosed wherein the butterfly transforms are modified with additional twiddle factors selected from a set of twiddle factors. In the alternative, the inputs to the butterfly processors of a correlator can be weighted as a function the additional twiddle factors. A set of signal samples is correlated for each combination of the set of additional twiddle factors and the largest correlation selected as the signal.

12 Claims, 10 Drawing Sheets

$$M_{2E} = \begin{vmatrix} \exp(j\varphi_2+\psi_2) & 0 & 0 & 0 & 0 & 0 & 0 & 0 \\ 0 & 1 & 0 & 0 & 0 & 0 & 0 & 0 \\ 0 & 0 & \exp(j\varphi_2+\psi_2) & 0 & 0 & 0 & 0 & 0 \\ 0 & 0 & 0 & -1 & 0 & 0 & 0 & 0 \\ 0 & 0 & 0 & 0 & \exp(j\varphi_2+\psi_2) & 0 & 0 & 0 \\ 0 & 0 & 0 & 0 & 0 & 1 & 0 & 0 \\ 0 & 0 & 0 & 0 & 0 & 0 & -\exp(j\varphi_2+\psi_2) & 0 \\ 0 & 0 & 0 & 0 & 0 & 0 & 0 & 1 \end{vmatrix}$$

170

$$M_{3E} = \begin{vmatrix} \exp(j\varphi_3+\psi_3) & 0 & 0 & 0 & 0 & 0 & 0 & 0 \\ 0 & \exp(j\varphi_3+\psi_3) & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & \exp(j\varphi_3+\psi_3) & 0 & 0 & 0 \\ 0 & 0 & 0 & 0 & 0 & \exp(j\varphi_3+\psi_3) & 0 & 0 \\ 0 & 0 & 0 & 0 & 0 & 0 & 1 & 0 \\ 0 & 0 & 0 & 0 & 0 & 0 & 0 & 1 \end{vmatrix}$$

172

$$M_{4E} = \begin{vmatrix} \exp(j\varphi_4+\psi_4) & 0 & 0 & 0 & 0 & 0 & 0 & 0 \\ 0 & \exp(j\varphi_4+\psi_4) & 0 & 0 & 0 & 0 & 0 & 0 \\ 0 & 0 & \exp(j\varphi_4+\psi_4) & 0 & 0 & 0 & 0 & 0 \\ 0 & 0 & 0 & \exp(j\varphi_4+\psi_4) & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{vmatrix}$$

FAST TRANSFORM SYSTEM FOR AN EXTENDED DATA RATE WLAN SYSTEM

CROSS-REFERENCE TO RELATED APPLICATIONS

Not applicable.

BACKGROUND OF THE INVENTION

The present invention relates to a wireless local area network (WLAN) and, more particularly, to a method and apparatus for correlating a signal of a WLAN having an extended data rate.

A wireless local area network (WLAN) is a data communication system implemented as an extension of or alternative to a wired data communication network (LAN). A WLAN provides location independent access between computing devices using radio frequency or other wireless communication techniques. WLANs have been or are being developed to conform to a number of standards, including the IEEE 802.11, Bluetooth and HomeRF standards. The IEEE 802.11 standard, INFORMATION TECHNOLOGY—TELECOMMUNICATIONS AND INFORMATION EXCHANGE BETWEEN SYSTEMS—LOCAL AND METROPOLITAN AREA NETWORKS—SPECIFIC REQUIREMENTS—PART 11: WIRELESS LAN MEDIUM ACCESS CONTROL AND PHYSICAL LAYER (PHY) SPECIFICATIONS, Institute of Electrical and Electronics Engineers, was approved in 1997 and a supplement providing for higher data rate WLANs, IEEE 802.11b, WIRELESS LAN MEDIUM ACCESS CONTROL (MAC) AND PHYSICAL LAYER (PHY) SPECIFICATIONS: HIGHER SPEED PHYSICAL LAYER (PHY) EXTENSION IN THE 2.4 GHz BAND, was approved in 1999. The IEEE 802.11 standards define a protocol and a compatible interface for data communication in a local area network via radio or infrared-air transmission. While the standard defines an infrared-air communication interface, radio frequency (RF) communication is the most commonly used communication method for WLAN implementation.

The IEEE 802.11 standard defines the physical layer (PHY) and a media access control (MAC) sublayer for WLANs with data rates of 1 Mbits/s or 2 Mbits/s using either frequency hopping spread spectrum (FHSS) or direct sequence spread spectrum (DSSS) RF communication techniques. These RF systems operate in the 2.4 GHz, ISM (Instrument, Scientific, and Medical) frequency band. As defined by local regulations, the ISM band extends from 2.4000–2.4835 GHz in the U.S., Canada and much of Europe. A similar, if not identical frequency band, is set aside for use by unlicensed RF radiators in several other countries.

For a frequency hopping system, the transmission frequency is periodically shifted in a pseudorandom pattern known to both the transmitter and the receiver. For North America and most of Europe, 79 hop channels of 1 MHz and a maximum channel dwell time of 400 ms are specified for IEEE 802.11 FHSS systems. FHSS permits a simpler transceiver design than that required for a DSSS system. However, high bit packing coding schemes required for reliable operation of FHSS in the narrow channels prescribed by the regulations become impractical at high data rates due to high signal-to-noise ratios. As a result, the data rate of practical FHSS, ISM band systems is relatively limited and DSSS is the technique of choice for higher data rate WLANs.

In a DSSS system, the modulated signal is spread over a transmission bandwidth greater than that required for the baseband information signal by directly modulating the baseband information signal with a pseudorandom noise (PN) or spreading code that is known to both the transmitter and the receiver. Each data bit of the baseband information is mixed with each of a plurality of chips or bits of the spreading code. For example, the spreading code for DSSS wireless networks conforming to the basic IEEE 802.11 standard is a Barker sequence comprising eleven chips having the sequence "01001000111" (non-polar signal) or "+1, −1, +1, +1, −1, +1, +1, +1, −1, −1, −1" (non-return to zero (NRZ) or polar signal). Referring to FIG. 1, each bit of the baseband data 20 is mixed (Exculsive-ORed) 22 with the eleven chips of the Barker sequence 24 to form an 11-chip codeword. A logic "0" baseband information bit is encoded as a first codeword 26 and a logic "1" is encoded as a second chip sequence or codeword 28.

The resulting multi-chip symbol or codeword is transmitted in the bit period of the baseband data bit or the time between the starting and ending of the baseband bit. If the bit rate for baseband information is 1 MSymbols/s, the eleven chip Barker sequence is encoded at a chipping rate of 11 MHz. In a phase shift key (PSK) modulated system like IEEE 802.11 systems, the encoded chips are transmitted as phase changes in the transmitted signal. Since the signal changes phase several times in the period required to transmit a single data bit, the frequency bandwidth must be wider than that required for the baseband. When the signal is demodulated, the frequency spreading is reversed and signals from potentially interfering radiators are eliminated decreasing the likelihood that the signal of interest will be jammed.

IEEE 802.11 compliant DSSS systems utilize differential phase shift keying where the relative phase difference between the waveforms received during to successive codeword intervals indicates the value of transmitted data. Differential binary phase shift keying (DBPSK) (one phase shift per information bit) modulation is used for transmission at the basic data rate of 1 Mbits/s. Differential quadrature phase-shift keying (DQPSK) (four phase shifts to encode two information bits) is used to increase the data transfer rate to 2 Mbits/s. For 2 Mbits/s DQPSK modulation, the information data stream is grouped into pairs of bits or dibits and one of four codewords is selected based on the values of the bits of a dibit. Alternate codewords are multiplied by either a first cosinusoidal phase-shift modulation signal and transmitted as a first "in-phase" (I) signal or a second 90° phase-shifted sinusoidal carrier at the same frequency and transmitted as a second "quadrature" (Q) signal. The 11-chip Barker code and a chip rate of 11 Mchip/s permits three non-overlapping DSSS channels in the ISM frequency band.

The preamble of the IEEE 802.11 data packet is used by the receiver to initiate spreading code synchronization is always transmitted as the DBPSK wave form. This permits all receivers to identify the transmitted waveform and, if the receiver is capable, switch to a higher rate mode of operation for interaction a particular WLAN device. The header of an IEEE 802.11 data packet which includes a cyclic redundancy check code, a packet payload transmission rate indicator, and payload length signal may be transmitted as either a DBPSK or DQPSK waveform.

To achieve higher data rates, the IEEE 802.11b revision adopts Complementary Code Keying (CCK) to replace the 11-chip Barker sequence for modulating data packet payloads. Complementary codes or binary, complementary sequences are polyphase codes comprising a pair of equal finite length sequences having the property that the number of pairs of like elements with any given separation in one series is equal to the number of pairs of unlike elements with the same separation in the second series. As a set, these code sequences have unique mathematical properties that facilitate distinguishing between code words at the receiver even in the presence of substantial noise and multipath interference. For an 11 Mbits/s data rate the information data stream is divided into eight bit segments. The values of six of the data bits are used to generate one of 64 unique subcodes. The values of the two remaining data bits are used to select one of the DQPSK phases for rotating the selected subcode producing 256 possible codewords for transmission. Systems operating in the 5.5 Mbits/s mode use two data bits to generate one of four subcodes and two bits are used to select one of the four DQPSK phases. With a symbol rate of 1.375 Msymbols/s, an eight chip spreading code, and a chipping rate of 11 MHz the high data rate waveform occupies approximately the same bandwidth as that of the 2 Mbits/s DQPSK waveform of the lower rate systems. As a result, the ISM band is sufficiently wide for three non-overlapping higher data rate channels promoting interoperability of the lower and higher data rate systems.

In a receiver, the "as received" analog signal is converted to a digital signal and correlation is used to strip the PN or spreading code from the digital signal. In the CCK modes utilized by the higher data rate systems, a bank of correlators followed by a largest correlation value detector is used to detect the modulation. The CCK codewords are an eight chip Walsh code that can be decoded with a fast Walsh transform. The correlators typically implement the transform as a butterfly function comprising 64 separate correlations requiring 512 complex additions to decode the 64 subcodes which are used to estimate six bits of reconstructed data. The remaining two bits of the signal are demodulated using the DQPSK demodulation. For 5 Mbits/s operation, 28 butterflies and 112 complex additions are required to decode two bits.

In a pending U.S. patent application, the inventor and others have disclosed a method of extending the data rate of a DSSS WLAN through the use of bandwidth efficient M-ary phase shift keying modulation. While the signals of the extended data rate system are structurally similar to those of the higher data rate IEEE 802.11b CCK operating modes, the information bits encode 4096 codewords for transmission. Correlation of the signal utilizing the process of the IEEE 802.11b CCK modes would require a substantial bank of correlators significantly increasing the cost and complexity of the transceiver. What is desired, therefore, is a method of correlating an M-ary PSK waveform that reduces the number of correlators required in a reciever.

BRIEF DESCRIPTION OF THE DRAWINGS

FIG. 8 is matrix decomposition of an eight chip complementary code keying 16-PSK signal vector.

DETAILED DESCRIPTION OF THE INVENTION

A wireless local area network (WLAN) is a data communication system that can be used to either replace or extend a wired local area network (LAN) infrastructure. WLANs may be implemented in a variety of systems including networks complying with, for example, the Bluetooth, HomeRF, the IEEE 802.11 and IEEE 802.11b standards. The IEEE 802.11 standards define a physical layer (PHY) and a medium access control (MAC) sublayer for a WLAN having origins in the IEEE 802.3 Ethernet wired LAN standard.

Figure 2:
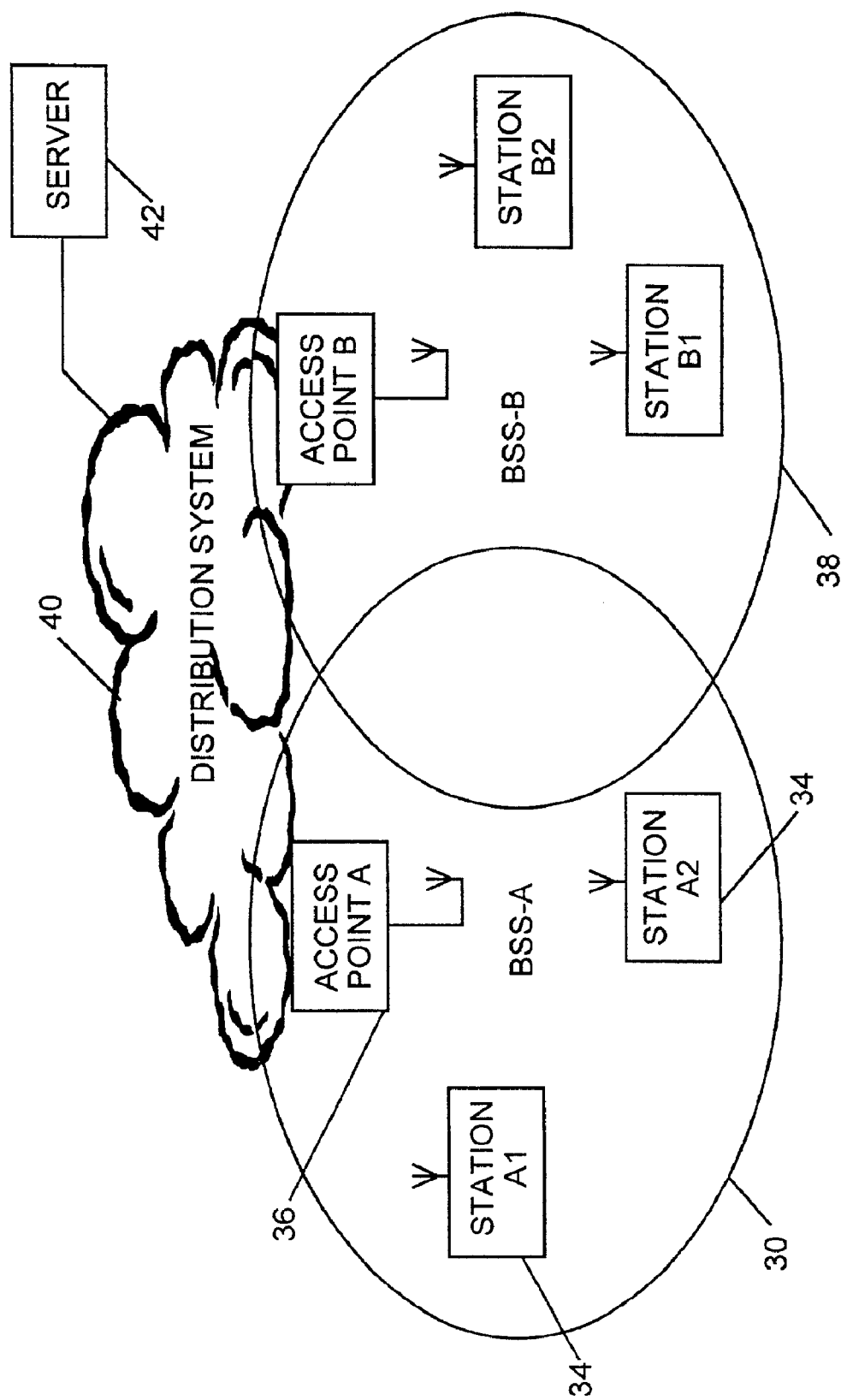
FIG. 2 is a schematic illustration of a topology of a WLAN.

Referring to FIG. 2, The basic topology of an IEEE 802.11 WLAN is referred to as a basic service set (BSS) 30 and comprises two or more wireless nodes or stations 34 that have recognized each other and established communications. If the network comprises only wireless stations 34, the RF transceivers of the stations communicate directly with each other on a peer-to-peer level sharing a given cell coverage area. This type of network is often formed on a temporary basis and is commonly referred to as an ad hoc network or independent basic service set (IBSS). In many instances, the basic service set will include an access point (AP) 36 providing a bridge between a wireless LAN and a wired LAN forming an infrastructure client server network. An access point 36 is immobile and forms part of the wired network infrastructure. The access point 36 includes an RF transceiver for wireless communication with a transceiver of at least one roaming mobile station 34. A mobile station may comprise a point-of-sale terminal, a bar code reader, a scanner, a cellular telephone, a personal computer and other types of data processing devices. When an access point 36 is available all communications between stations or between a station and a wired network client go through the access point. An additional WLAN topology is known as the extended service set (ESS). An ESS comprises a plurality of overlapping basic service sets 30 and 38 (each including an access point 36) that are connected together by means of a distribution system 40. Although the distribution system could be any type of network, it is typically a component of a wired Ethernet LAN including a server 42. Mobile stations 34 can roam between access points 36 and move from one basic service 30 set to another 38. Since WLANs are temporary networks by nature, interoperability between a wide variety of network devices is highly desirable.

The IEEE 802.11 standard specifies versions of the network physical layer that provide for either direct sequence spread spectrum (DSSS) or frequency hopping spread spectrum (FHSS) radio frequency communication in the 2.4 GHz ISM (Instrument, Scientific, and Medical) frequency band. In the U.S., Canada, and much of Europe, an ISM frequency band extending between 2.4000 GHz and 2.4835 GHz is reserved for use by unlicensed RF radiators. An identical or similar frequency band is reserved by regulation in a number of other countries for unlicensed RF operation. While frequency hopping spread spectrum systems utilize a simpler transceiver than DSSS systems, the data rate of FHSS systems is more limited than that of DSSS systems.

Therefore, DSSS is the technology of choice for higher data rate systems and, in particular, the higher data rate systems specified by the IEEE 802.11b revision, WIRELESS LAN MEDIUM ACCESS CONTROL (MAC) AND PHYSICAL LAYER (PHY) SPECIFICATIONS: HIGHER SPEED PHYSICAL LAYER (PHY) EXTENSION IN THE 2.4 GHz BAND, Institute of Electrical and Electronics Engineers, 1999. For the purpose of simplifying the description of the correlation method, it is assumed that the transmitters and receivers operate according to the IEEE 802.11 and IEEE 802.11b DSSS standards and in accordance with the modulation method disclosed in the co-pending application referred to above. However, this assumption is for the purpose of illustration only and the methods described herein may be employed in DSSS wireless communication systems complying with other standards or even in communication systems other than wireless data processing networks.

Figure 3:
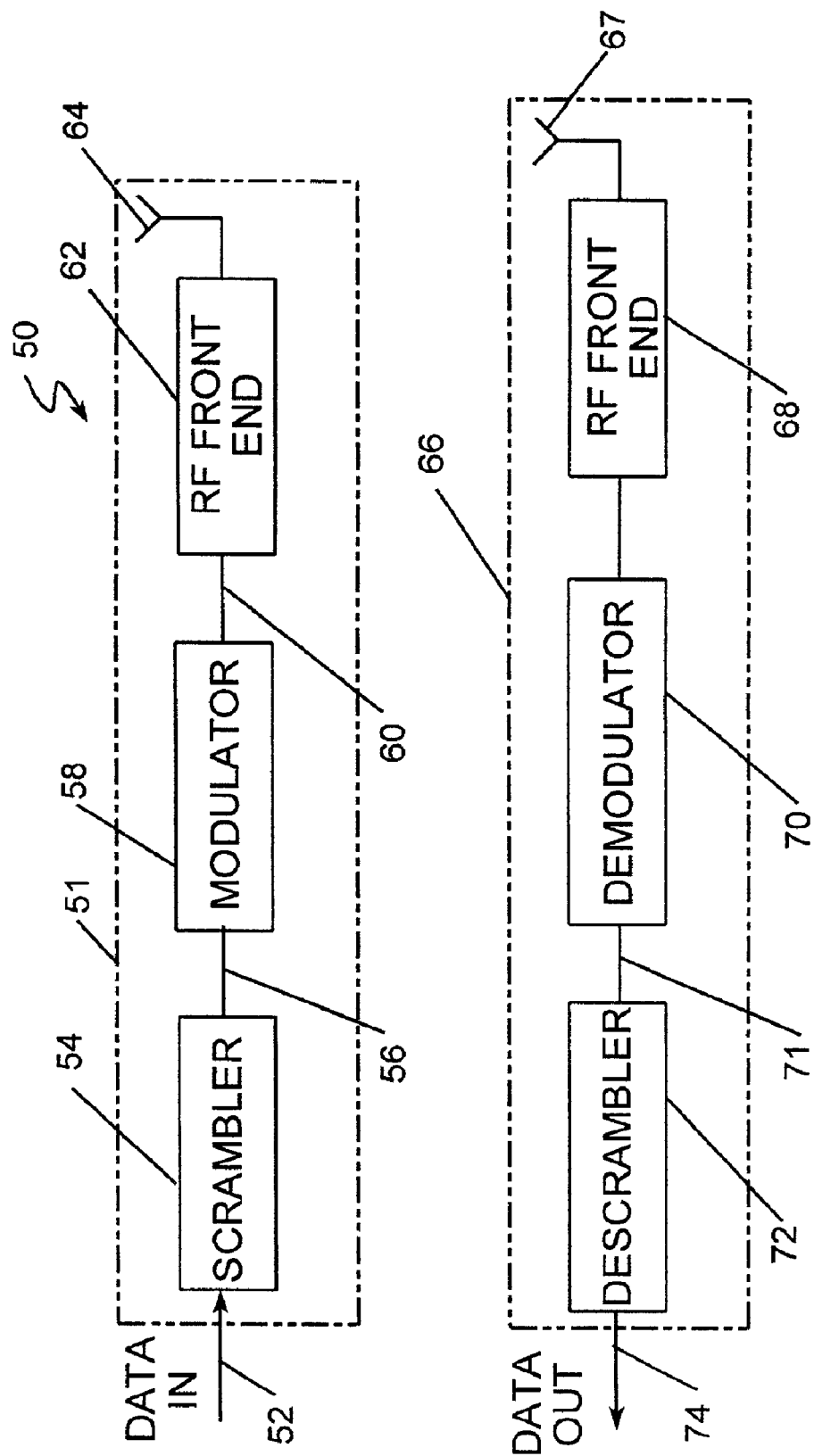
FIG. 3 is a block diagram of a direct sequence spread spectrum transceiver.

FIG. 3 illustrates a high level block diagram of a DSSS transceiver 50. In the transmitter section 51 of the transceiver 50, an input signal, DATA IN 52, is received by a scrambler 54. The scrambler 54 scrambles the input signal 52 to avoid repeating patterns in the data. The output of the scrambler 54 is the information bit stream 56 to be transmitted. The information bit stream 56 is input to a modulator 58. In the modulator 58 the information bit stream 56 is mixed with a spreading code and modulated to produce a stream of encoded codewords 60. The mixing and modulation process is typically accomplished by segmenting the serial information bitstream 56 and using the values of the information bits to select one of a number of known codewords for transmission. In an RF front end 62 the codeword signals are filtered, amplified and used to drive an antenna 64.

The signal transmitted from a transmitter antenna 64 is received by an antenna 67 of a receiver portion 66 of a transceiver 50. In the receiver 66 the process utilized in the transmitter 51 is reversed to reconstruct the data. The RF front end 68 includes conventional filtering and amplification circuitry to condition the signal and remove unwanted frequencies. In a demodulator 70 the coded signals are "de-rotated," correlated and then decoded. In the higher data rate IEEE 802.11b compliant systems, the demodulator 70 applies a fast transform with a butterfly implementation to decode the information bit stream 71. Since the transmitted signal may be distorted due to interference and multipath fading during transmission, the output of the demodulator is an estimate of the bits of the original scrambled information bit stream. The reconstructed information bit stream is unscrambled in a descrambler 72 and the reconstructed DATA OUT 74 is output by the receiver 66.

Figure 1:
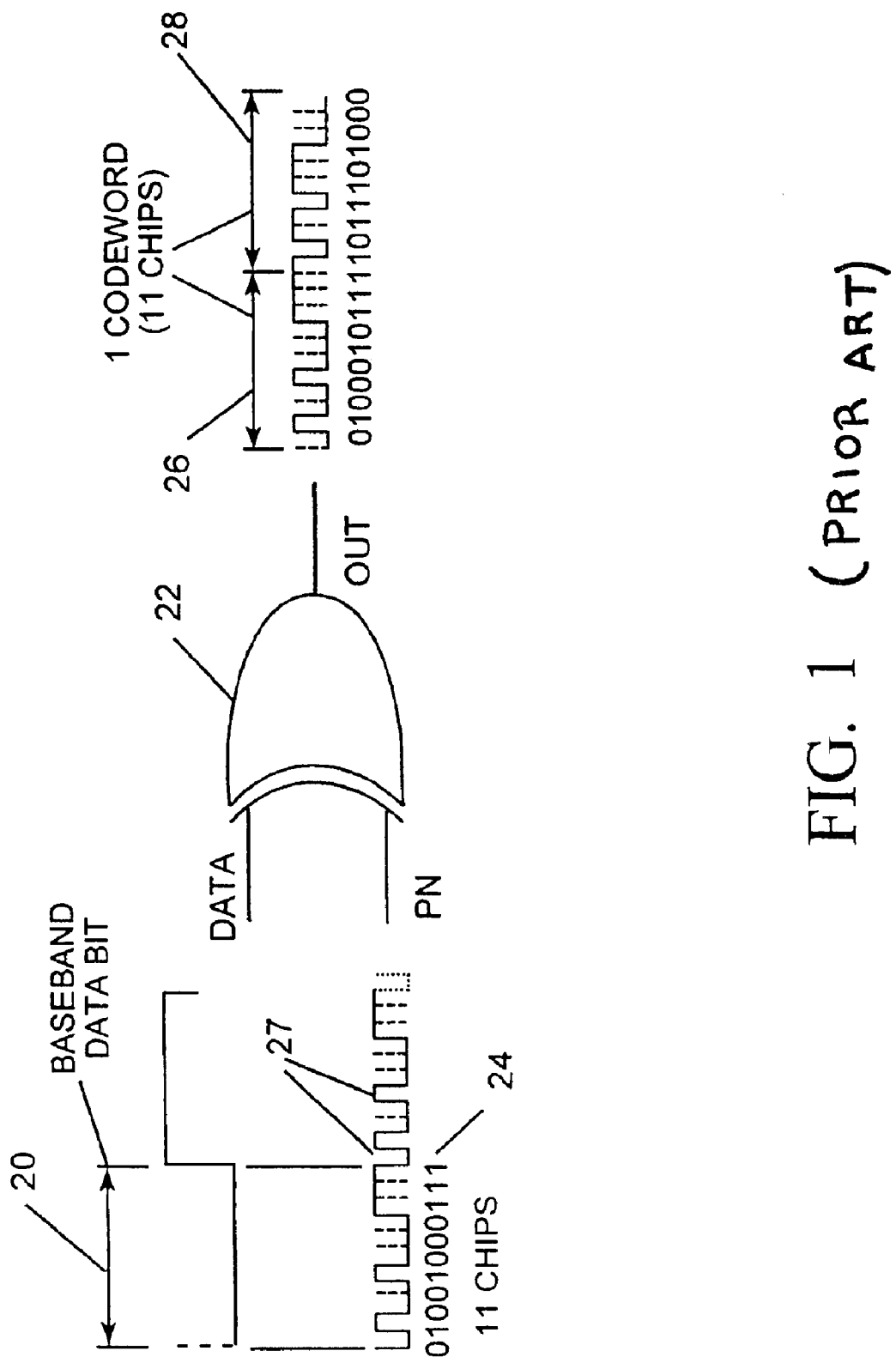
FIG. 1 is a schematic illustration of direct sequence spread spectrum modulation.

In a DSSS system, direct modulation of the baseband information signal with a pseudorandum noise (PN) or spreading code known to both the transmitter and the receiver is used to spread the modulated output signal over a greater bandwidth than the bandwidth required for the baseband information. Referring to FIG. 1, the spreading code for DSSS wireless networks conforming to the basic IEEE 802.11 standard is a Barker code sequence 24 comprising eleven chips 28 having the sequence "01001000111" (non-polar signal) or "+1, −1, +1, +1, −1, +1, +1, +1, −1, −1, −1" (non-return to zero (NRZ) or polar signal). Each data bit of information to be transmitted is mixed (or Exculsive-ORed ) 22 with the chips of the Barker sequence spreading code 24. A logic "0" information bit is encoded as a first codeword sequence of 11 chips 26 and a logic "1" is encoded as a second codeword sequence 28. An entire codeword 26 or 28 is transmitted in a bit period, the interval between the beginning and end of an information data bit or symbol 20. If the information data bit rate is 1 MSymbols/s, the encoded eleven chip Barker sequence is transmitted at a chipping rate of 11 MHz.

IEEE 802.11 compliant DSSS systems utilize differential phase shift keying where the relative phase difference between the waveforms received in successive periods indicates the value of transmitted data. Since the plurality of encoded chips of a codeword are transmitted in a single bit period, the frequency bandwidth of the transmitted signal must be wider than that required for the baseband to accommodate the rapid phase changes of the encoded chips. IEEE 802.11 systems operating at the basic data rate of 1 Mbits/s utilize differential binary phase shift keying (DBPSK). Each data bit of information is used to select one 11-chip codeword for transmission. For an information data rate of 1 Mbits/s and a chipping rate of 11 Mchips/s transmitted in a 2 MHz null-to-null bandwidth, a spectrum of approximately 22 MHz is required for the DBPSK transmission of the basic system. Differential quadrature phase shift keying is used for systems operating at a 2 Mbits/s data rate. The information bit stream is segmented into successive pairs of bits or dibits. The values of the bits of each dibit are used to select one of four codewords. Successive codewords are alternately multiplied by either a cosinusoidal carrier to produce an "in-phase" (I) signal or a 90° phase-shifted sinusoidal carrier of the same frequency to produce a quadrature (Q) signal. Since two bits are coded per codeword, the transmission requires the same spectrum as is required for the lower data rate system.

The preambles of IEEE 802.11 data packets are used by the receiver to initiate spreading code synchronization and are always transmitted as the DBPSK wave form. This permits all receivers to identify the transmitted waveform. Then, if the receiver is capable, the receiver can switch to the higher data rate mode for operation with a particular WLAN device. The header of an IEEE 802.11 data packet which includes a cyclic redundancy check code, transmission rate indicator and a packet payload length indicator, may be transmitted as either a DBPSK or DQPSK waveform. The payload of the data packets for IEEE 802.11 lower data rate systems may be transmitted with either DBPSK (1 Mbits/s mode) or DQPSK (2 Mbits/s mode) modulation.

For higher data rate IEEE 802.11b compliant systems, packet payload modulation is accomplished with a complementary code sequence of eight complex chips instead of the 11-chip Barker sequence of the lower data rate systems. Complementary codes or binary complementary sequences are polyphase codes comprising a pair of equal finite length sequences having the property that the number of pairs of like elements with any given separation in one series is equal to the number of pairs of unlike elements with the same separation in the second series. As a set, these codes have unique mathematical properties that facilitate distinguishing between the codewords or symbols at the receiver even in the presence of substantial noise and multipath interference. With a symbol rate of 1.375 MSymbols/s, an 11 Mbits/s Complementary Code Keying (CCK) waveform occupies approximately the same spectrum as that of the 2 Mbits/s DQPSK waveform of lower rate systems. As a result, even at the higher data rates, three non-overlapping channels can occupy the ISM band facilitating interoperability with systems designed to operate in the 1 Mbits/s and 2 Mbits/s modes.

The 8-bit CCK code sequences utilized in the IEEE 802.11b higher data rate systems are derived from the formula:

$$c = \left\{ \begin{array}{l} e^{j(\varphi_1+\varphi_2+\varphi_3+\varphi_4)}, e^{j(\varphi_1+\varphi_3+\varphi_4)}, e^{j(\varphi_1+\varphi_2+\varphi_4)}, -e^{j(\varphi_1+\varphi_4)}, \\ e^{j(\varphi_1+\varphi_2+\varphi_3)}, e^{j(\varphi_1+\varphi_3)}, -e^{j(\varphi_1+\varphi_2)}, e^{j\varphi_1} \end{array} \right\}$$

where c is the codeword having the least significant bit first and the most significant bit last. The phase parameters $\phi_1$, $\phi_2$, $\phi_3$, and $\phi_4$ determine the phase values of the chips of complex code word and are defined in the IEEE 802.11b standard. The coding is a form of the Hadamard transform encoding where $\phi_1$ is included in all chips, $\phi_2$ is included in all odd chips, $\phi_3$ is included in all odd pairs of chips, and $\phi_4$ is included in all odd quads of chips.

Since the phase parameter $\phi_1$ is common to all chips, terms including $\phi_1$ can be factored from the codeword to produce a subcode that is a function of the phase parameters $\phi_2$, $\phi_3$, and $\phi_4$ as follows:

$$c_s = \left\{ \begin{array}{l} e^{j(\varphi_2+\varphi_3+\varphi_4)}, e^{j(\varphi_3+\varphi_4)}, e^{j(\varphi_2+\varphi_4)}, -e^{j(\varphi_4)}, \\ e^{j(\varphi_2+\varphi_3)}, e^{j(\varphi_3)}, -e^{j(\varphi_2)}, 1 \end{array} \right\}$$

where: $c = c_s \cdot e^{j\Phi_1}$

For operation at the 11 Mbits/s mode, the serial information data stream is partitioned into bytes comprising bits (d7, d6, d5 . . . , d0) where d0 is the least significant bit and is first in time. The values of six bits of each byte (dibits ($d_2$, $d_3$), ($d_4$, $d_5$), and ($d_6$, $d_7$)) encode the phase parameters $\phi_2$, $\phi_3$, and $\phi_4$ as follows:

| Data Bits ($d_i$, $d_{i+1}$) | Phase ($\phi_k$) |
|---|---|
| 00 | 0 |
| 01 | $\pi/2$ |
| 10 | $\pi$ |
| 11 | $3\pi/2$ |

Typically, the values of the six bits are used to select one of 64 subcodes having phase parameters mapped from the input data bits as indicated above.

For operation in the 5.5 Mbits/s mode, the serial data stream is partitioned into four bit (nibble) segments. The values of the bits $d_2$ and $d_3$ of each nibble are used to select one of four subcodes having a phase parameter mapped according to the table above.

The phase parameter $\phi_1$ modifies all of the chips of the codeword and is used in the DQPSK modulation of the selected subcodes. Differential modulation is performed by rotating each successive codeword 180° ($\pi$) relative to its predecessor. The phase parameter $\phi_1$, therefore, is determined from the values of the bits $d_0$ and $d_1$ of the bit stream segment and the position of the codeword in the stream of codewords, as follows:

| Data Bits ($d_0$, $d_1$) | Phase change (+j$\omega$) Even codeword | Phase change (+j$\omega$) Odd codeword |
|---|---|---|
| 00 | 0 | $\pi$ |
| 01 | $\pi/2$ | $3\pi/2$ |
| 11 | $\pi$ | 0 |
| 10 | $3\pi/2$ | $\pi/2$ |

As a result, in the 11 Mbits/s operating mode eight data bits select one of 256 codewords and in the 5.5 Mbits/s operating mode four bits select one of 64 codewords which are a subset of the codewords used for the higher rate mode.

Referring to FIG. 3, in the receiver 66 a bank of correlators followed by a largest correlation modulus selector is used to decode the "as received" signal. The CCK codeword is an eight chip signal vector having a generalized Hadamard structure that can be decoded with a fast transform. Since the CCK codewords are created by encoding $\phi_1$ across all chips of the signal, $\phi_2$ across all odd chips, $\phi_3$ across all odd pairs of chips and $\phi_4$ across all odd chip quads, each of the phase parameters can be factored from out of the codeword as follows:

$$c = e^{j(\phi_1)}\{e^{j(\phi_4)}\{e^{j(\phi_3)}\{e^{j(\phi_2)}, 1\}, \{e^{j(\phi_3)}\{e^{j(\phi_2)}, 1\}, \{e^{j(\phi_2)}, 1\}\}$$

Figure 4:
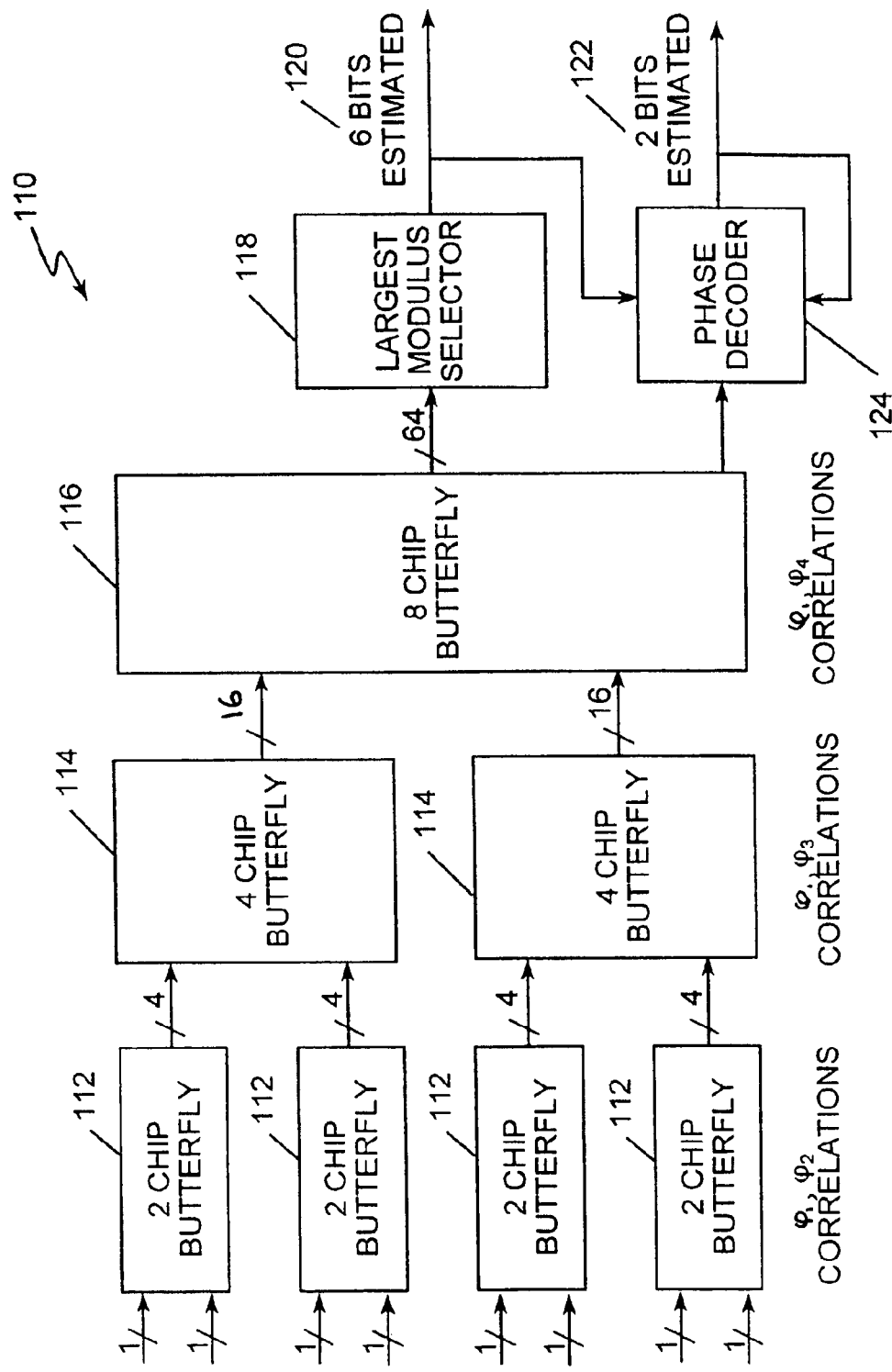
FIG. 4 is a block diagram of a correlator for a direct sequence spread spectrum communication system employing complementary code keying, differential quadrature phase shift key (DQPSK) modulation.
Figure 5:
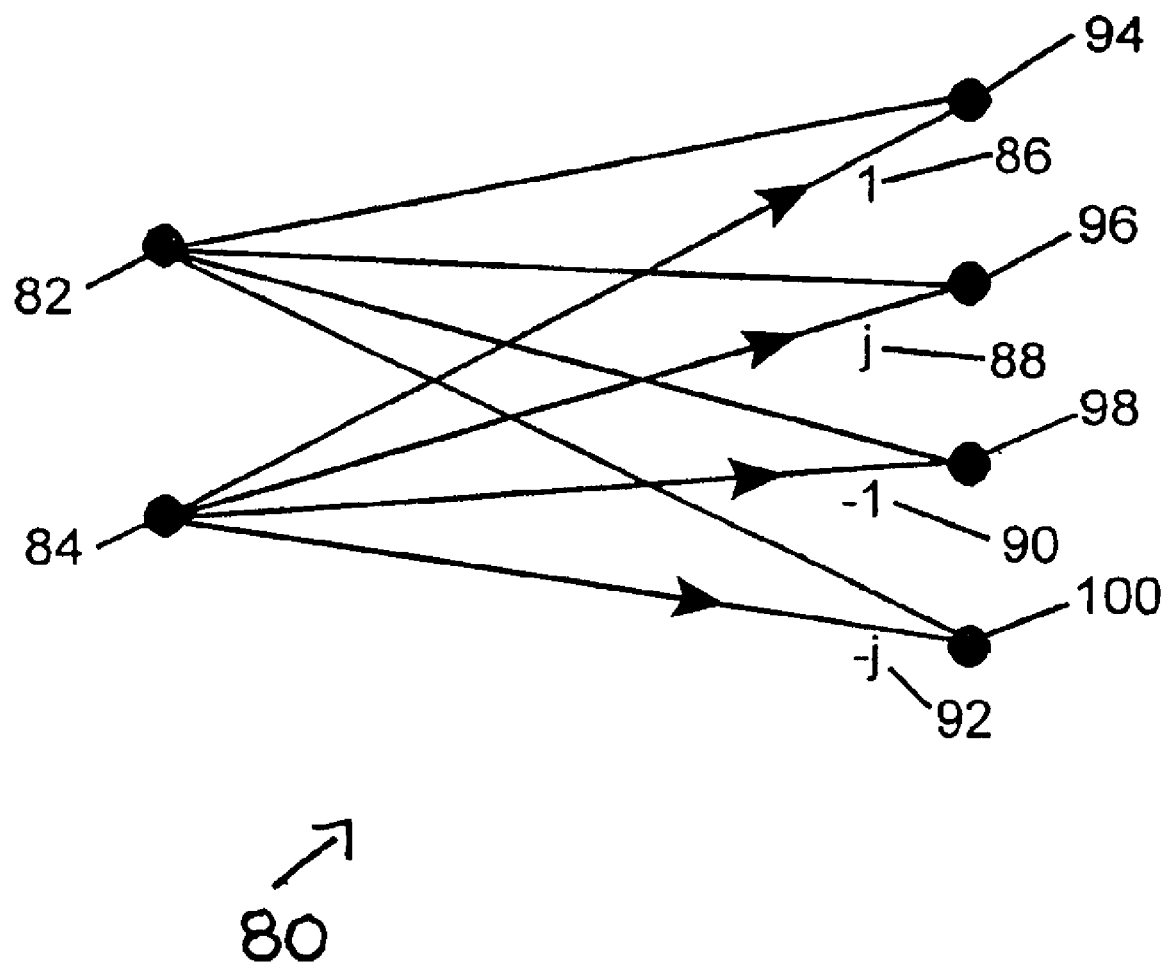
FIG. 5 is a graphical illustration of a butterfly transform structure.

A butterfly fast transform correlation structure having two inputs and four outputs can be defined for each factorization where an input comprises a set of correlations from the preceding transform stage. Since $\phi_1$ is encoded across all chips, a butterfly is not needed for its correlation. The basic butterfly structure for CCK chips is illustrated in FIG. 5. The operation of the butterfly 80 comprises an ordered addition and subtraction of the inputs 82 and 84 and multiplication of an input by an appropriate twiddle factor 86, 88, 90, or 92 to produce the four butterfly transform outputs 94, 96, 98, and 100. Since the phase parameters $\phi_2$, $\phi_3$, and $\phi_4$ can be factored from the codeword, the correlation can occur in stages. As illustrated in FIG. 4, in IEEE 802.11b correlator 110 the $\phi_2$ correlations occur in the four, two chip butterfly processors 112. The four outputs of the pairs of two chip butterflies 112 are input to a pair of four chip butterfly processors 114. Likewise, the two sets of 16 outputs of four chip butterflies 114 are input to an 8 chip butterfly processor 116 which produces 64 correlations. The largest modulus selector 118 selects the largest of the 64 correlations as the "as received" signal permitting six bits 120 of the information to be estimated. Another two bits of information 122 are estimated in a phase decoder 124 by differentially decoding of $\phi_1$ from the results of the output of the 8 chip butterfly 116 and the six estimated information bits 120.

Figure 6:
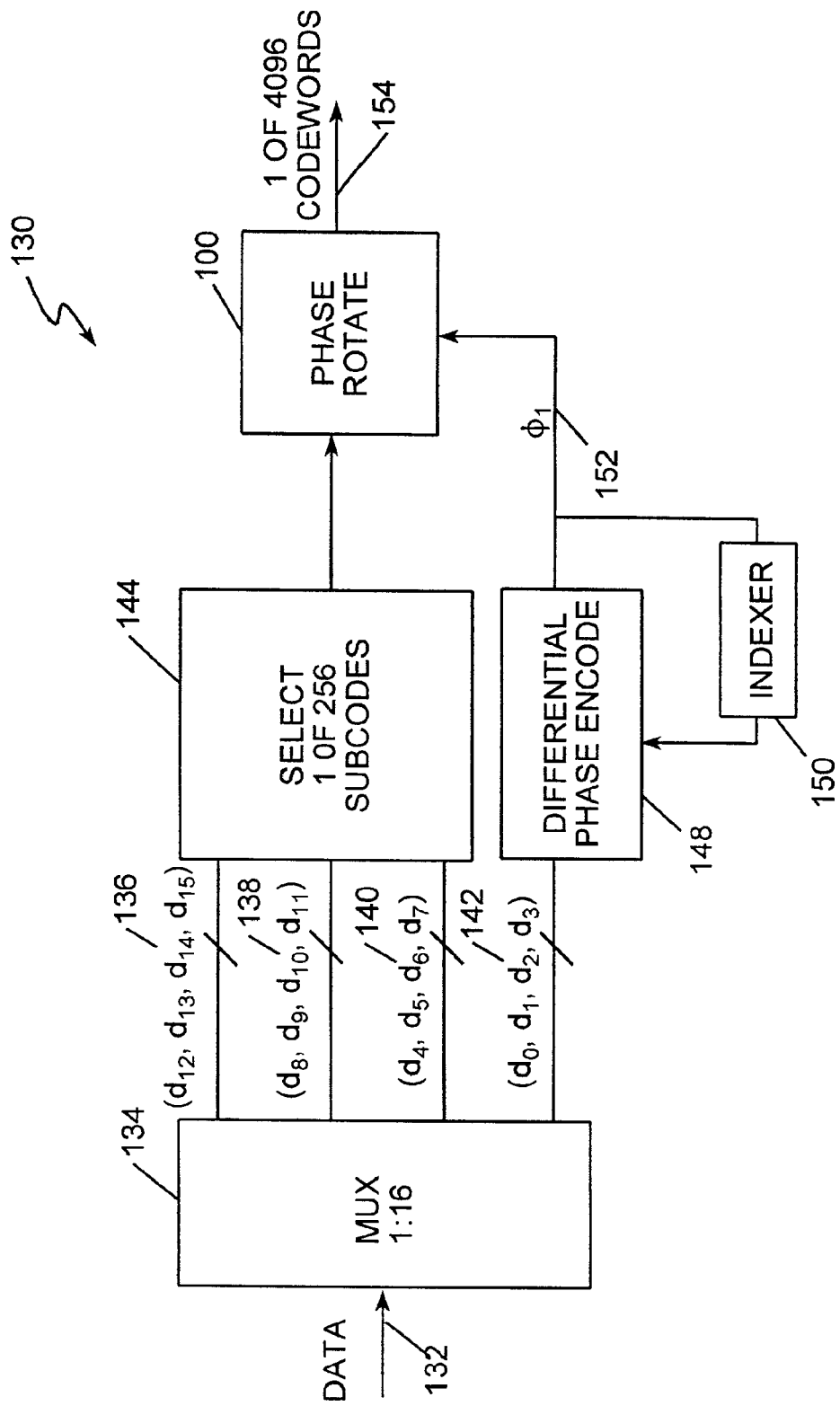
FIG. 6 is a block diagram of a 16-PSK complementary code keying modulator for a direct sequence spread spectrum communication system.

A method of bandwidth efficient multilevel modulation for a DSSS wireless system using M-PSK (M-ary phase shift keying) is disclosed in the co-pending U.S. Patent application referenced above. Attaining a 22 Mbits/s data rate with a symbol rate of 1.375 Mbits/s requires that each transmitted codeword encode 16 data bits (16-PSK modulation). Referring to FIG. 6, in the 16-PSK modulator 130 the serial information data bit stream 132 is partitioned into 16-bit words (bits $d_0$–$d_{15}$) by a serial to parallel multiplexer 134. The words are further grouped into four bit nibbles 136, 138, 140 and 142 at the output of the multiplexer 134. The values of the bits in each nibble are mapped to the phase parameters $\phi_1$, $\phi_2$, $\phi_3$, and $\phi_4$. Three nibbles, bits ($d_4$, $d_5$, $d_6$, $d_7$) 136; ($d_8$, $d_9$, $d_{10}$, $d_{11}$) 138; ($d_{12}$, $d_{13}$, $d_{14}$, $d_{15}$) 140; respectively, are mapped to the phase parameters $\phi_2$, $\phi_3$, and $\phi_4$. In other words, the values of bits of three nibbles are used to select one of 256 subcodes 144. Since the phase parameter $\phi_1$ is common to all chips of the codeword, it is used to differentially modulate the entire codeword. The phase parameter $\phi_1$ 152 is encoded by initially mapping the values of the four data bits $d_0$, $d_1$, $d_2$, and $d_3$ 142 to select one of two values of $\phi_1$ which are rotated 180° to each other. One of the two possible values of $\phi_1$ is selected as a function the sequence of the codeword in the bit stream as determined by an indexer 150. Alternately a differential phase encoder 148 selects phase parameter $\phi_1$ that is rotated 180° relative to that of the previous codeword to differentially modulate the signal. As a result, 16 information bits are used to select one of 4096 codewords 154 for transmission.

While the codewords of the extended data rate system are structurally similar to the codewords of the high data rate (IEEE 802.11b) systems facilitating interoperability, a substantial bank of additional correlators would be required to correlate the 4096 codewords of the extended data rate system. Including such a large number of correlators in a transceiver would be costly. However, the inventor concluded that with slight modification the correlator of a high data rate (IEEE 802.11b) system can be used to correlate the signal of the extended data rate system.

Figure 7:
FIG. 7 is matrix decomposition of an eight chip complementary code keying DQPSK signal vector.

First, the inventor observed the 64 correlations of the eight chip signal vector of the high data rate system can be performed efficiently by decomposing the signal to:

$$c \cdot r^* = \sum c_k r_k^* = Sum(M_4 \cdot M_3 \cdot r^*)$$

where the Sum(.) function computes the sum of the elements of its vector argument and $M_4$ 160, $M_3$ 162, and $M_2$ 164 are 8×8 matrices of the vector argmeument as illustrated in FIG. 7. Since the values of all off-diagonal elements of the matrices are zero, the signal can be decomposed to:

$$c \cdot r^* = \sum c_k r_k^* = tr(M_4 \cdot M_3 \cdot M_2 \cdot r^*)$$

where tr(.) computes the sum of the elements along the diagonal of the matrices $M_4$ 160, $M_3$ 162, and $M_2$ 164. In the high data rate system, the determination of the product of the three matrices is implemented as a butterfly fast transform in the correlator 110 as illustrated in FIG. 4. The trace of each pair of elements along the diagonal of $M_2$ 164 is implemented in a two chip butterfly transform processor 112, each quad of elements along the diagonal of $M_3$ 162 is implemented as a four chip butterfly transform 114 and the eight diagonal elements of $M_4$ 160 are correlated in the eight chip butterfly processor 116.

The inventor observed that the phase parameters of the codewords of the extended data rate system can have the values defined by the set:

$S=\{0, \pi/8, \pi/4, 3\pi/8, \pi/2, 5\pi/8, 3\pi/4, 7\pi/8, \pi, 9\pi/8, 5\pi/4, 11\pi/8, 3\pi/2, 13\pi/8, 7\pi/4, 15\pi/8\}$

Further, the Set S can be decomposed into the following four sets:

$S_0=\{0, \pi/2, \pi, 3\pi/2\}$ $S_1=\{\pi/8, 5\pi/8, 9\pi/8, 13\pi/8,\}=\pi/8+S_0$ $S_2=\{\pi/4, 3\pi/4, 5\pi/4, 7\pi/4,\}=\pi/4+S_0$ $S_3=\{3\pi/8, 7\pi/8, 11\pi/8, 15\pi/8\}=3\pi/8+S_0$

However, $S_0$ is the set of phase parameters used in the QPSK modulation of the high data rate (5.5/11 Mbits/s) systems. Therefore:

$$c \cdot r^* = \sum c_k r_k^* = tr(M_{4E} \cdot M_{3E} \cdot M_{2E} \cdot r^*)$$

where the traces of the matrices are the sums of elements along the diagonals and where $M_{4E}$ 174, $M_{3E}$ 172, and $M_{2E}$ 170 are 8×8 matrices having the elements illustrated in FIG. 8, respectively. In the matrices $M_{2E}$ 170, $M_{3E}$ 172, and $M_{4E}$ 174, if $\psi_2$, $\psi_3$, and $\psi_4$ each take on, successively, one of the four different values in the set $\{0, \pi/8, \pi/4, 3\pi/8\}$, hereinafter the twiddle factor set, the 4096 correlations ($4^3 \times 64$) necessary for correlating the 16-PSK signal of the extended data rate system can be performed.

Figure 9:
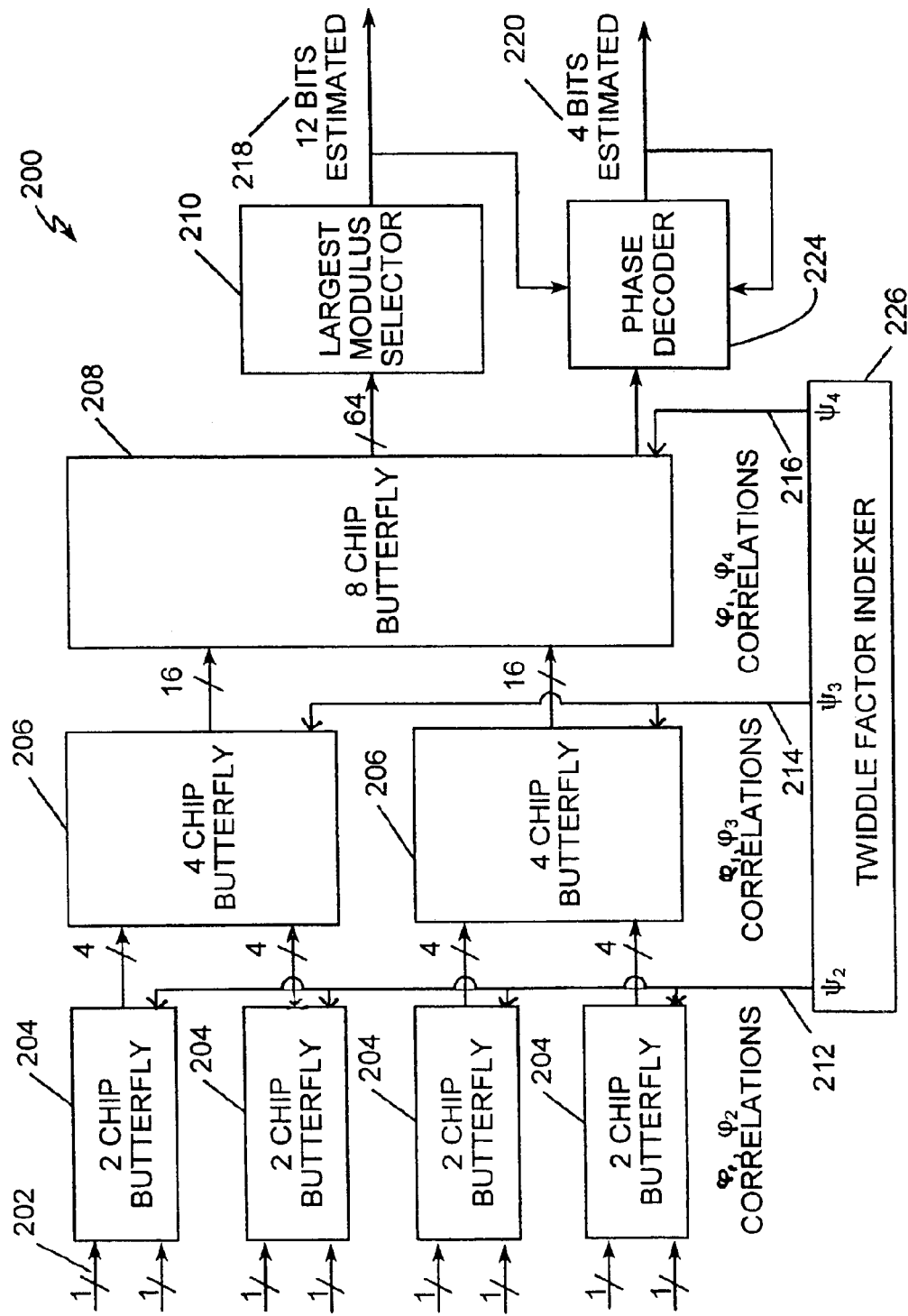
FIG. 9 is block diagram of a 16-PSK, complementary code keying signal correlator.

Referring to FIG. 9, a correlator 200 of the extended data rate system has some structural similarity to the correlator 110 for the high data rate IEEE 802.11b system. Eight bits of the received signal bitstream are input 202 individually to the eight inputs of the four, two chip butterfly processors 204. The 16 outputs of the two chip butterflies 202 are input to two, four chip butterfly processors 206 and the 32 outputs of the four chip butterflies are, in turn, input to an eight chip butterfly processor 208. Likewise, the 64 outputs of the eight chip butterfly 208 are input to a largest modulus selector 210. In the correlator of the extended data rate system, the each butterfly device includes an additional input for the assertion of an additional twiddle factor. The twiddle factors of the twiddle factor set $\psi_2$ 212, $\psi_3$ 214, and $\psi_4$ 216 are applied to the 2 chip butterfly processors 204, the four chip butterfly processors 206, and the eight chip butterfly processor 208, respectively. The additional twiddle factors modify (by multiplication) the existing twiddle factors (1, j, −1, −j) of the basic butterfly 80.

To correlate a received signal, the eight samples 202 of the signal are applied to the inputs of the two chip butterfly processors 204 which are modified by the application of an additional twiddle factor $\psi_2$ 212 from the twiddle factor set. The transformed outputs of the two chip butterflies 204 are input to the four chip butterfly processor 206 which is modified by the application a value of $\psi_3$ 214. The transformed four chip butterfly outputs are applied to the eight chip butterfly processor 208 which is modified by the additional twiddle factor $\psi_4$ 216. The largest of the resulting 64 transformed outputs of the eight chip butterfly 208 is selected by the largest modulus selector 210 and stored in a register in the selector. The twiddle factor indexer 226 selects another value from the twiddle factor set for one of the twiddle factors $\psi_2$ 212, $\psi_3$ 214, and $\psi_4$ 216 and then the correlation process is repeated for the eight input samples. The eight input samples 202 are correlated for each of the 64 combinations of $\psi_2$ 212, $\psi_3$ 214, and $\psi_4$ 216 produced by the values in the twiddle factor set. At the conclusion of each pass, the largest correlation produced by the pass is compared to the stored largest correlation and the larger of the two stored for the next pass. The largest correlation produced by the multiple passes is selected as received signal and used to select one of 256 subcodes which are mapped to estimate 12 bits of the information 218. DQPSK demodulation of the $\phi_1$ phase parameter in the phase decoder 224 provides an estimation of another four bits of the information 220.

Figure 10:
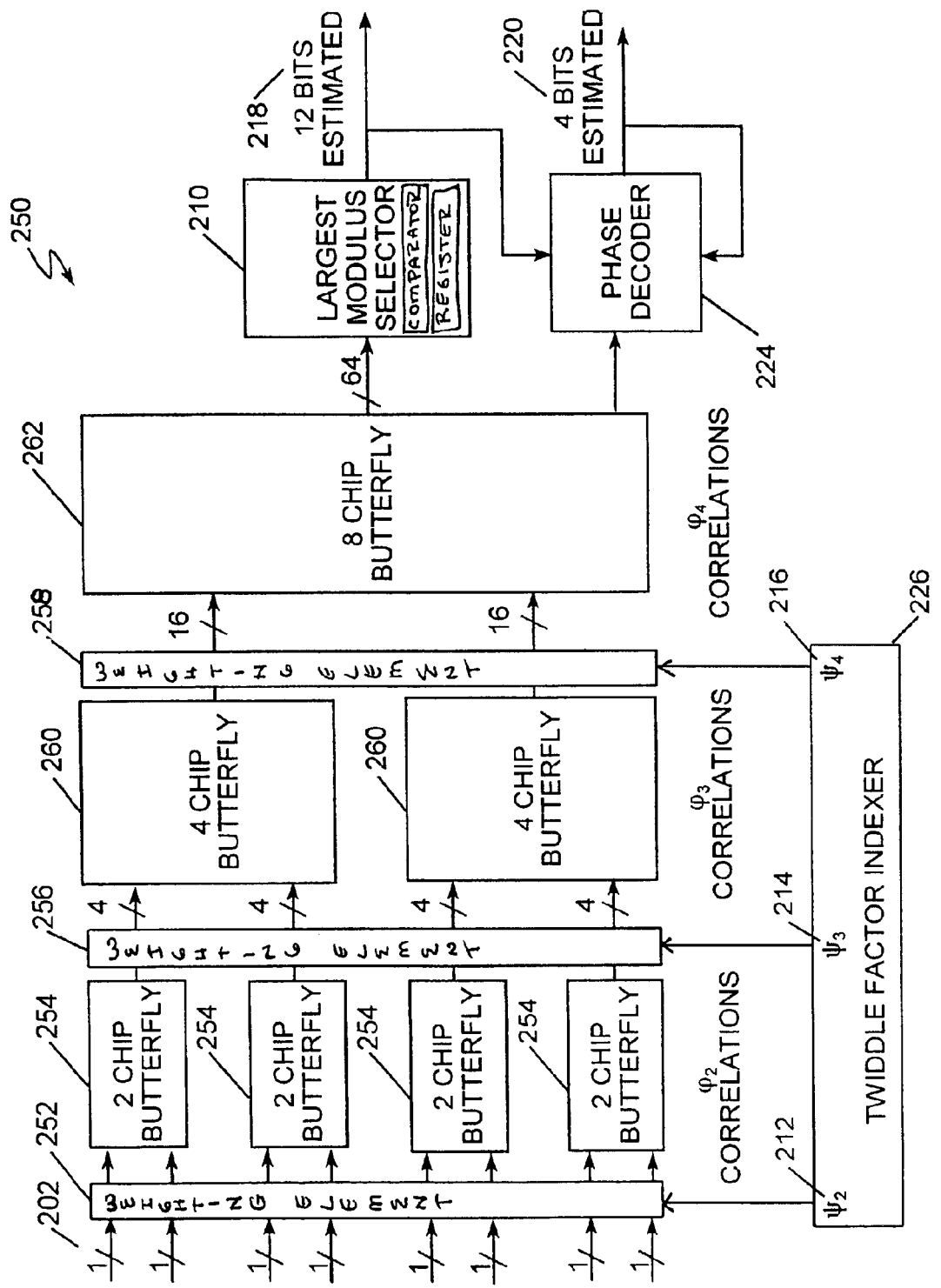
FIG. 10 is block diagram of an alternative construction for a 16-PSK, complementary code keying signal correlator.

Referring to FIG. 10, an alternative construction for a correlator 250 for the extended data rate weights the samples at the input to the butterfly devices. Weighting element 252 applies appropriate $\psi_2$ twiddle factor weighting to the inputs to the two chip butterfly processors 254. Likewise, weighting elements 256 and 258 apply $\psi_3$ weighting and $\psi_4$ weighting to the inputs to the four chip butterfly processors 260 and the eight chip butterfly processor 262, respectively. In other respects, the correlator 250 operates in the manner described for correlator 200. Weighting the inputs for the additional twiddle factor before application of the butterfly produces the same result as modifying the butterfly by application of the additional twiddle factor, but has the advantage that no change is required to the butterfly processor hardware from that used for the IEEE 802.11b higher data rate CCK correlators.

Correlation of the signals of the high data rate system can be performed by with the correlators 200 and 250 of the extended data rate system. Since the set So is the set of possible phase parameter values for the high data rate system, setting $\psi_2$ 212, $\psi_3$ 214, and $\psi_4$ 216 to zero and correlating the eight samples with a single pass through the extended data rate correlator 200 or 250 correlates the high data rate signal.

Utilizing the method and apparatus of the present invention, it is possible to correlate bandwidth efficient multilevel M-ary phase shift key modulated signals with a number of correlators suitable for less complex signals. As a result, complication of the transceiver is minimized, reducing cost, but permitting operation at higher data rates.

All the references cited herein are incorporated by reference

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of correlating a signal comprising the steps of:
   (a) selecting a plurality of samples of said signal;
   (b) modifying a first butterfly transform with a first twiddle factor;
   (c) transforming said samples with said modified first butterfly transform;
   (d) modifying a second butterfly transform with a second twiddle factor;
   (e) transforming an output of said first butterfly transform with said modified second butterfly transform;
   (f) modifying a third butterfly transform with a third twiddle factor;
   (g) transforming an output of said second butterfly transform with said modified third butterfly transform;
   (h) selecting a largest output of said third butterfly transform; and
   (i) repeating steps (b)–(h) for a plurality of values of said first, said second, and said third twiddle factors.

2. The method of claim 1 wherein a value of said first, said second and said third twiddle factors is selected from a twiddle factor set comprising values 0, $\pi/8$, $\pi/4$, and $3\pi/8$.

3. The method of claim 1 wherein the step of selecting the largest output of said third butterfly transform comprises the steps of:
   (a) storing a first output of said third butterfly transform;
   (b) comparing a second output of said third butterfly transform to said stored first output; and
   (c) replacing said stored first output with said second output if said second output is larger than said stored first output.

4. A method of correlating a signal comprising the steps of:
   (a) selecting a plurality of samples of said signal;
   (b) modifying said samples with a function of a first twiddle factor;
   (c) transforming said samples with a first butterfly transform;
   (d) modifying an output of said first butterfly transform with a function of a second twiddle factor;
   (e) transforming said modified first butterfly output with a second butterfly transform;
   (f) modifying an output of said second butterfly transform with a function of a third twiddle factor;
   (g) transforming said modified second butterfly output with a third butterfly transform;
   (h) selecting a largest output of said third butterfly transform; and
   (i) repeating steps (b)–(h) for a plurality of values of said first, said second, and said third twiddle factors.

5. The method of claim 4 wherein a value of said first, said second and said third twiddle factors is selected from a twiddle factor set comprising values 0, $\pi/8$, $\pi/4$, and $3\pi/8$.

6. The method of claim 4 wherein the step of selecting the largest output of said third butterfly transform comprises the steps of:
   (a) storing a first output of said third butterfly transform;
   (b) comparing a second output of said third butterfly transform to said stored first output; and
   (c) replacing said stored first output with said second output if said second output is larger than said stored first output.

7. A correlator for a direct sequence spread spectrum signal comprising:
   (a) a weighting device to modify a sample of said signal as a function of a first twiddle factor;
   (b) a first butterfly processor transforming a pair of modified samples of said signal;
   (c) a second weighting device to modify an output of said first butterfly processor as a function of a second twiddle factor;
   (d) a second butterfly processor transforming said modified output of said first butterfly processor;
   (e) a third weighting device to modify an output of said second butterfly processor as a function of a third twiddle factor;
   (f) a third butterfly processor transforming said weighted output of said second butterfly processor;
   (g) a largest modulus selector to identify a largest output of said third butterfly processor; and
   (h) a twiddle factor indexer successively varying a value of at least one of said first, said second, and said third twiddle factors.

8. The apparatus of claim 7 wherein said twiddle factor indexer varies the value of at least one of said first, said second and said third twiddle factors with one of a value selected from a twiddle factor set comprising values 0, $\pi/8$, $\pi/4$, and $3\pi/8$.

9. The apparatus of claim 7 wherein said largest modulus selector comprises:
   (a) a comparator for comparing a first and a second output of said third butterfly processor; and
   (b) a register for storing a largest of said first and said second outputs of said third butterfly processor.

10. A correlator for a direct sequence spread spectrum signal comprising:
    (a) a first butterfly processor transforming a pair of samples of said signal as a function of a first twiddle factor;
    (b) a second butterfly processor transforming an output of said first butterfly processor as a function of a second twiddle factor;
    (c) a third butterfly processor transforming an output of said second butterfly processor as a function of a third twiddle factor;
    (d) a largest modulus selector to identify a largest output of said third butterfly processor; and (e) a twiddle factor indexer varying in succession a value of at least one of said first, said second, and said third twiddle factors.

11. The apparatus of claim 10 wherein said twiddle factor indexer varies the value of at least one of said first, said second and said third twiddle factors with one of a value selected from a twiddle factor set comprising values $0$, $\pi/8$, $\pi/4$, and $3\pi/8$.

12. The apparatus of claim 10 wherein said largest modulus selector comprises:
  (a) a comparator for comparing a first and a second output of said third butterfly processor; and
  (b) a register for storing a largest of said first and said second outputs of said third butterfly processor.

* * * * *

UNITED STATES PATENT AND TRADEMARK OFFICE
CERTIFICATE OF CORRECTION

PATENT NO. : 6,882,692 B2
APPLICATION NO. : 09/753047
DATED : April 19, 2005
INVENTOR(S) : V. Srinivasa Somayazulu It is certified that error appears in the above-identified patent and that said Letters Patent is hereby corrected as shown below:

On the Title page, paragraph Item (57) Abstract, line 14
Change "function the" to read --function of the--.

Col. 2, line 36
Change "received during to successive" to read --received during two successive--.

Col. 2, line 54
Change "code synchronization is" to read --code synchronization and is--.

Col. 2, line 58
Change "for interaction a particular" to read --for interaction with a particular--.

Col. 4, line 1
Change "FIG. 7 is matrix" to read --FIG. 7 is a matrix--.

Col. 4, line 3
Change "FIG. 8 is matrix" to read --FIG. 8 is a matrix--.

Col. 4, line 5
Change "FIG. 9 is block" to read --FIG. 9 is a block--.

Col. 4, line 7
Change "FIG. 10 is block" to read --FIG. 10 is a block--.

Col. 8, line 61
Change "is selected as a function the" to read --is selected as a function of the--.

Col. 9, line 15
Change "$c \cdot r^* = \Sigma c_k r_k^* = Sum(M_4 \cdot M_3 \cdot r^*)$" to read --$c \cdot r^* = \Sigma c_k r_k^* = Sum(M_4 \cdot M_3 \cdot M_2 \cdot r^*)$ --.

Col. 9, line 20
Change "argmeument" to read --argument--.

Col. 10, line 28
Change "the application a value" to read --the application of a value--.

UNITED STATES PATENT AND TRADEMARK OFFICE
CERTIFICATE OF CORRECTION

PATENT NO. : 6,882,692 B2
APPLICATION NO. : 09/753047
DATED : April 19, 2005
INVENTOR(S) : V. Srinivasa Somayazulu It is certified that error appears in the above-identified patent and that said Letters Patent is hereby corrected as shown below:

Col. 11, line 14
Change "by reference" to read --by reference.--.

Signed and Sealed this

First Day of May, 2007

JON W. DUDAS
*Director of the United States Patent and Trademark Office*